(12) United States Patent
Sun

(10) Patent No.: US 12,481,573 B2
(45) Date of Patent: Nov. 25, 2025

(54) APPARATUS AND METHOD FOR DEBUGGING AUTONOMOUS DRIVING APPLICATION WITH CONDITIONAL BREAKPOINT

(71) Applicant: WOVEN BY TOYOTA, INC., Tokyo (JP)

(72) Inventor: Linyu Sun, Miyoshi (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 210 days.

(21) Appl. No.: 17/686,500

(22) Filed: Mar. 4, 2022

(65) Prior Publication Data
US 2023/0281107 A1  Sep. 7, 2023

(51) Int. Cl.
G06F 11/362 (2025.01)
(52) U.S. Cl.
CPC ................. *G06F 11/3636* (2013.01)
(58) Field of Classification Search
CPC ...... G06F 11/3636; G06F 30/20; G06F 30/15; G06F 11/3457
See application file for complete search history.

(56) References Cited

U.S. PATENT DOCUMENTS

| 9,262,305 B1 | 2/2016 | Wilmot et al. |
| 9,690,686 B1 | 6/2017 | Wilmot et al. |
| 2007/0168994 A1 | 7/2007 | Barsness et al. |
| 2012/0317550 A1 | 12/2012 | Lindahl et al. |
| 2015/0121346 A1 | 4/2015 | Patel et al. |
| 2018/0032421 A1 | 2/2018 | Hati et al. |
| 2019/0087307 A1 | 3/2019 | Zhan et al. |
| 2019/0340103 A1* | 11/2019 | Nelson ............... G06F 11/3636 |
| 2022/0004769 A1* | 1/2022 | Zhao ..................... G06V 20/56 |
| 2022/0198096 A1* | 6/2022 | Danna ................ G06F 11/3684 |
| 2023/0059562 A1* | 2/2023 | Chan .................. G06F 11/3688 |
| 2023/0234613 A1* | 7/2023 | Whiteside .......... B60W 60/0011 |

FOREIGN PATENT DOCUMENTS

| CN | 113626317 A | 11/2021 |
| JP | 2018-538583 A | 12/2018 |

OTHER PUBLICATIONS

Yuntianyi Chen et al.; A Comprehensive Study of Bug-Fix Patterns in Autonomous Driving Systems; ACM; 23 pages; retrieved on Jul. 2, 2025 (Year: 2025).*

* cited by examiner

*Primary Examiner* — S. Sough
*Assistant Examiner* — Cuong V Luu
(74) *Attorney, Agent, or Firm* — Sughrue Mion, PLLC

(57) ABSTRACT

A method for debugging an autonomous driving application includes setting a line breakpoint in a line of source code of the application; setting a trigger condition relative to simulation data of a simulator executing the application; running the application by a debugger for debugging the application; and pausing running of the application by the debugger based on the line breakpoint being reached and the trigger condition being hit.

16 Claims, 5 Drawing Sheets

APPARATUS AND METHOD FOR DEBUGGING AUTONOMOUS DRIVING APPLICATION WITH CONDITIONAL BREAKPOINT

BACKGROUND

1. Technical Field

The present disclosure relates to debugging an autonomous driving application, and in particular, relates to debugging an autonomous driving application by triggering a breakpoint in a debugger based on a condition being satisfied.

2. Description of Related Art

A given autonomous driving simulator uses various simulation models to test a particular application for use in an autonomous driving vehicle, such as an autonomous driving stack that controls an ego vehicle or a perception application that detects surrounding objects from a camera image. A related art autonomous driving simulation system includes a core simulator, a vehicle simulator, and one or more sensor simulators. Via the core simulator, the virtual world of the simulation can be defined, as well as the actors and their movements. The vehicle simulator simulates an autonomous driving vehicle (ego vehicle) and includes a vehicle controller to control a position of the vehicle based on surrounding objects. The sensor simulator simulates various sensors of the ego vehicle, and includes a camera sensor model for capturing images of the ego vehicle's surroundings in the virtual world. While the core simulator is run to test an application, log data is generated by the simulator. This log data can be subsequently replayed by a log player to debug the application in conjunction with a debugger.

Typically, a user can use the debugger to set breakpoints at particular lines of the source code, i.e., line breakpoints. Upon debugging the application, e.g., executing the application in a debug mode, the debugger suspends the simulation once the execution reaches the line on which the breakpoint is set. This allows the user to perform any of various debugging steps, such as analyzing variable values, program parameters, and the call stack, as well as stepping through and/or running back the application.

SUMMARY

In the context of a core simulator for an autonomous driving simulation, however, large amounts of serial data are generated. This could be in the range of tens of thousands of frames for one execution of the simulation. When replaying, the debugger will stop at the line breakpoint at each enumeration, i.e., at every frame of the serial data. This results in a tedious, inconvenient and impractical debugging, particularly where the user is interested in analyzing program parameters or variables at a specific frame (e.g., a frame right before a collision occurs or a particular item fails). To reach that specific frame, the user will have to step through the breakpoint in each frame prior. Further, if the user were to manually break the execution at the frame of interest, it is nearly impossible to precisely time the break at the exact line of code at which the user desires to analyze the log data.

The present disclosure provides a method and device for debugging an autonomous driving application by triggering a breakpoint in a debugger based on a condition being satisfied.

An aspect of the disclose provides a method for debugging an autonomous driving application. The method may include setting a line breakpoint in a line of source code of the application; setting a trigger condition relative to simulation data of a simulator executing the application; running the application by a debugger for debugging the application; and pausing running of the application by a debugger based on the line breakpoint being reached and the trigger condition being satisfied.

The simulation data may be log data generated by the simulator, and the trigger condition may be a log breakpoint in a time line of the log data.

The setting the trigger condition may include setting the trigger condition via a log player for replaying the log data.

The pausing the running of the application may include, based on the log breakpoint being reached, pausing a replaying of the log data by the log player and sending a notification to the debugger; and based on the notification being received by the debugger, pausing the running of the application by the debugger at the line breakpoint.

In response to the notification being received by the debugger, the debugger may begin checking for the line breakpoint.

The method may farther include replaying of the log data by the log player. The replaying of the log data by the log player comprises sending log data to the debugger and checking the replayed log data for the log breakpoint.

The log breakpoint may be set at a timeline or a play bar of the log player.

The trigger condition may be a simulation condition in the simulator, and the setting the trigger condition may include setting the trigger condition in the simulator.

The pausing the running of the application may include, based on the simulation condition being satisfied while executing the application by the simulator, pausing the simulator and sending a notification to the debugger; and based on the notification and the line breakpoint being reached, pausing the running of the application by the debugger.

In response to the notification being received by the debugger, the debugger may begin checking for the line breakpoint.

The method may further include executing the application by the simulator. Executing the application by the simulator may include checking for the simulation conditions.

The simulation condition may be one of a time to a collision between an ego vehicle and an object being less than a particular threshold, a failure of a particular model or object, a distance between the ego vehicle and objects or a lane line being less than a predetermined value, an ego vehicle speed being greater than a particular value, and an ego vehicle acceleration being greater than a particular value.

Another aspect of the disclosure provides a device for debugging an autonomous driving application. The device may include a memory store at least one instruction; and a processor configured to execute the at least one instruction to: set a line breakpoint in a line of source code of the application; set a trigger condition relative to simulation data of a simulator executing the application; run the application by a debugger for debugging the application; and pause running of the application by a debugger based on the line breakpoint being reached and the trigger condition being satisfied.

The simulation data may be log data generated by the simulator, and the trigger condition may be a log breakpoint in a time line of the log data; and the setting the trigger condition may include setting the trigger condition via a log player for replaying the log data.

The processor may be configured to execute the at least one instruction to: based on the log breakpoint being reached, pause a replaying of the log data by the log player and sending a notification to the debugger; and based on the notification being received by the debugger, pause the running of the application by the debugger at the line breakpoint.

The processor may be configured to execute the at least one instruction to, in response to the notification being received by the debugger, control the debugger to begin checking for the line breakpoint.

The processor may be configured to execute the at least one instruction to replay the log data by the log player. The replaying of the log data by the log player may include sending log data to the debugger and checking the replayed log data for the log breakpoint.

The log breakpoint may be set at a timeline or a play bar of the log player.

The trigger condition may be a simulation condition in the simulator, and the setting the trigger condition may include setting the trigger condition in the simulator.

The processor may be configured to execute the at least one instruction to: based on the simulation condition being satisfied while executing the application by the simulator, pause the simulator and sending a notification to the debugger; and based on the notification and the line breakpoint being reached, pause the running of the application by the debugger.

The processor may be configured to execute the at least one instruction to, in response to the notification being received by the debugger, control the debugger to being checking for the line breakpoint.

The processor may be configured to execute the at least one instruction to execute the application by the simulator. Executing the application by the simulator may include checking for the simulation conditions.

The simulation condition may be one of a time to a collision between an ego vehicle and an object being less than a particular threshold, a failure of a particular model or object, a distance between the ego vehicle and objects or a lane line being less than a predetermined value, an ego vehicle speed being greater than a particular value, and an ego vehicle acceleration being greater than a particular value.

Another aspect of the disclosure provides a non-transitory computer-readable medium storing instructions. The instructions may include one or more instructions that, when executed by one or more processors of a device, cause the one or more processors to: set a line breakpoint in a line of source code of an autonomous driving application; set a trigger condition relative to simulation data of a simulator executing the application; run the application by a debugger for debugging the application; and pause running of the application by a debugger based on the line breakpoint being reached and the trigger condition being satisfied.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

A debugging method according to the present disclosure provides a conditional breakpoint for debugging an autonomous driving application. To provide precise timing for breaking the execution at the code of interest, a line breakpoint may be set in the source code. Meanwhile, to prevent repetitive breaks at each frame of the log data, the debugger according to an embodiment may not be triggered to stop execution unless both the line breakpoint and an additional trigger condition are hit. The additional trigger condition may be set in relation to simulation data, either in log data via a log player or in a simulation execution itself.

Figure 1:
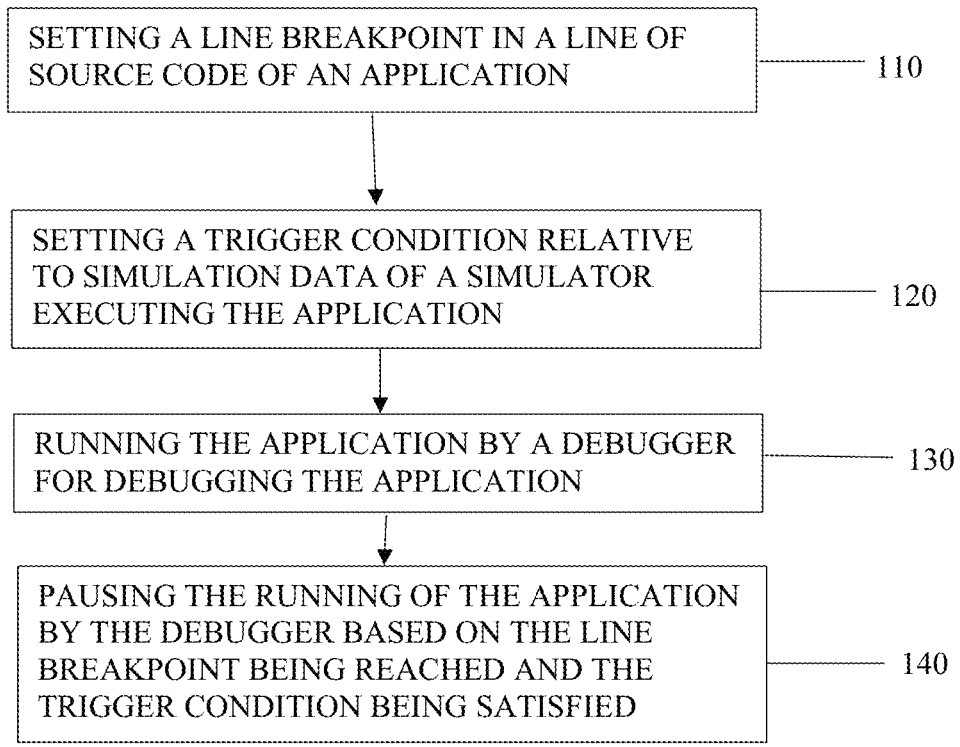
FIG. 1 is a flowchart of an overview of a method of debugging an application using conditional breakpoints according to an embodiment.

FIG. 1 is a flowchart of an overview of a method of debugging an application using conditional breakpoints according to an embodiment.

Referring to FIG. 1, at operation 110, a line breakpoint may be set in a source code of the application. For example, a line breakpoint may be set at entry to a function so the application may be analyzed at that point. In some embodiments, multiple line breakpoints may be set throughout the source code at positions where analysis may be performed.

At operation 120, a trigger condition is set relative to simulation data of a simulator running the application. In an embodiment, the trigger condition may be set in log data (e.g., via a log player) produced by the simulation. For example, one or more log breakpoints may be set at a timeline or play bar of the log player, thereby allowing the particular frame at which the user desires to analyze the code or the application to be easily selected. In another embodiment, the trigger condition may be set via the simulator, based on a condition detected (or to be detected) in the simulator. For example, simulation conditions may be set as a time of collision between an ego vehicle and an object being less than a particular threshold, a failure of a particular model or object, a distance between an ego vehicle and objects or a lane line being less than a predetermined value, an ego vehicle speed being greater than a particular value, and/or an ego vehicle acceleration being greater than a particular value. As a result, the user can easily select a desired point of time in the simulation to debug the application.

At operation 130, the application may be run by a debugger (e.g., the application may be executed in a debug mode). The debugger may be in communication with the simulator running the application and/or a log player playing log data produced by the simulator while running the application. In some embodiments, the debugger may run concurrently with the simulator and/or the log player.

At operation 140, the running of the application by the debugger may be paused (break) based on the line breakpoint being reached and the trigger condition being satisfied. For example, as the debugger is running, multiple line breakpoints may be reached. However, the debugger will pass line breakpoints without pausing execution if the trigger condition has not been satisfied. Once the trigger condition is satisfied, the bugger is notified by the simulator or the log player (e.g., by receiving a pause call), and the debugger will pause the next time it reaches a line breakpoint in the source code.

In this way, some implementations herein permit efficient debugging by only breaking at relevant points based on a condition being satisfied. That is, as a result of the conditional breakpoint, a precise line of code can be set for debugging at a specific frame of a simulation or log data without repeatedly stopping execution at each frame of the serial data.

Figure 2:
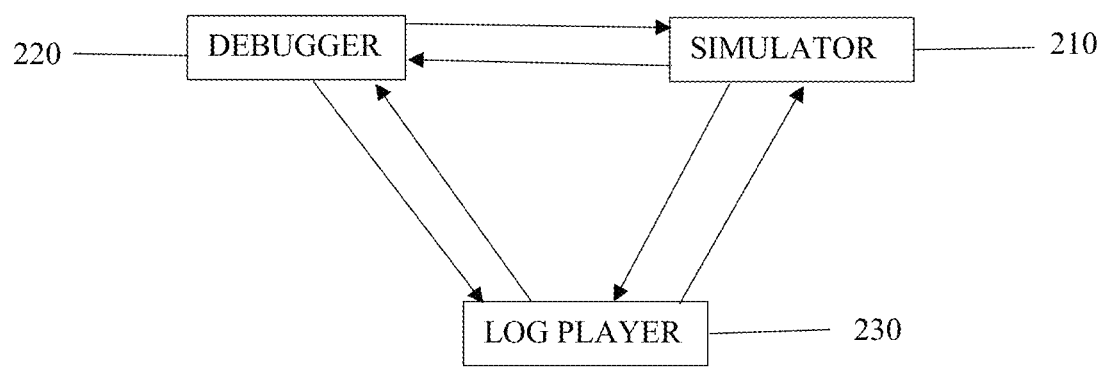
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, the environment 200 may include a simulator 210, a debugger 220, and a log player 230 in communication with each other. According to an embodiment, the components of the environment 200 may be implemented as software programs running on a single device such as a personal computer, workstation computer, a server device, or other types of computation and/or communication devices. In other embodiments, the components may operate on multiple devices that are interconnected via wired connections, wireless connections, or a combination of wired and wireless connections.

The number and arrangement of devices and networks shown in FIG. 2 are provided as an example. In practice, there may be additional components, fewer components, different components, or differently arranged components than those shown in FIG. 2. For example, in various embodiments, one of the simulator and the log player may be omitted.

Figure 3:
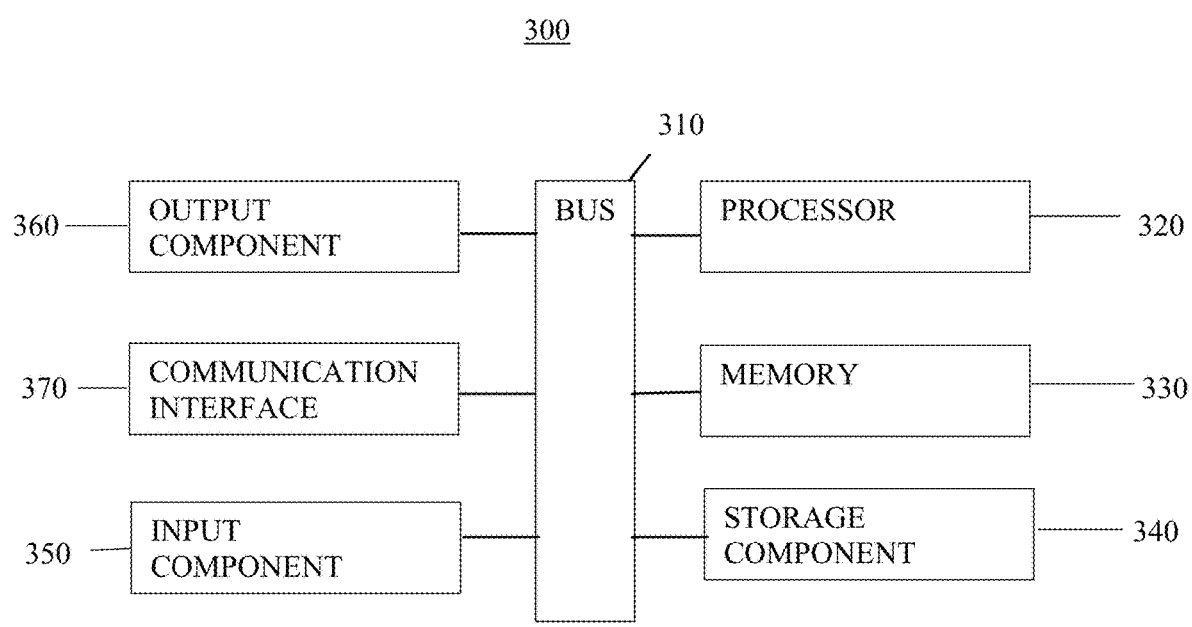
FIG. 3 is a diagram of example components of a device for performing the method of debugging according to an embodiment.

FIG. 3 is a diagram of example components of a device 300 for performing the method 100 of debugging according to an embodiment. The device 300 may correspond a single device that performs the method 100 or one of multiple devices that perform the method 100. The device 300 may include or implement at least one of the simulator 210, the debugger 220, and the log player 230 illustrated in FIG. 2. As shown in FIG. 3, the device 300 may include a bus 310, a processor 320 (or at least one processor), a memory 330 (or at least one memory), a storage component 340, an input component 350, an output component 360, and a communication interface 370.

The bus 310 may include a component that permits communication among the components of the device 300. That is, the bus 310 is a communication system or subsystem that permits the transfer of data and information between the components of the device 300.

The processor 320 may be implemented in hardware, firmware, or a combination of hardware and software. The processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 320 includes one or more processors capable of being programmed to perform a function.

The memory 330 stores information and/or instructions for use by the processor 320. The memory 330 may include at least one of a random access memory (RAM), a read only memory (ROM), and/or another type of dynamic or static storage device (e.g., a flash memory, a magnetic memory, and/or an optical memory) for storing information and/or instructions.

The storage component 340 may store information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 may include a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 may include a component that provides output information from the device 300 (e.g., a display, a speaker, one or more light-emitting diodes (LEDs), an interface for connecting to an external display or speaker, etc.).

The communication interface 370 may include a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes via the processor 320 executing software instructions stored in a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of device 300.

Figure 4:
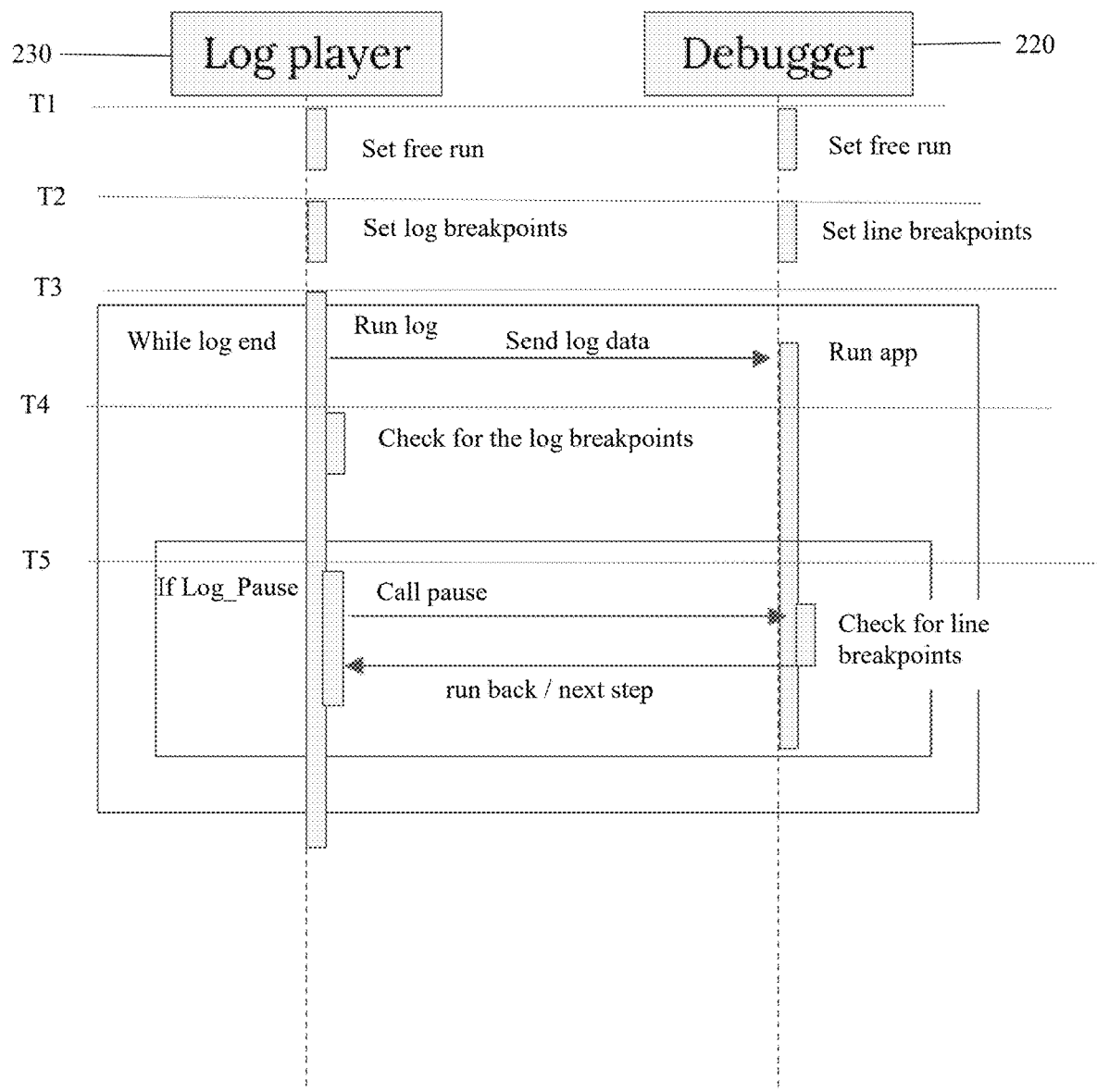
FIG. 4 is a diagram of an example process 400 for debugging an application according to an embodiment.

FIG. 4 is a diagram of an example process 400 for debugging an application according to an embodiment. According to some embodiments, the application may be an autonomous driving application. In some implementations, one or more operations of FIG. 4 may be performed by the device 300. In some implementations, one or more operations of FIG. 4 may be performed by another device or a group of devices separate from or including the device 300.

As shown in FIG. 4, the process 400 may include a log player 230 communicating with a debugger 220. Log data generated by a simulator 210 that simulates a vehicle executing the application in a particular scenario may be input into the log player 230 and the source code from the application may be input into the debugger 220. For example, a simulator 210 on the device 300 may execute an autonomous driving application and may generate log data, which is subsequently replayed by the log player 230.

Once the log data has been input into the log player 230 and the source code of the autonomous driving application is input into the debugger 220, at time T1, both the log player 230 and debugger 220 are set to free run.

At time T2 (or prior), one or more trigger conditions may be set in the log player 230 as log breakpoints. For example, log breakpoints may be set at a timeline or play bar of the log player 230. Thus, the particular frame at which the user desires to analyze the code or the application can be easily selected.

Also at time T2 (or a different time), one or more line breakpoints may be set in the source code being run by the debugger 220. The line breakpoints may be set at points in the code that may benefit from analysis. For example, a line breakpoints may be set at a location of the code corresponding to the onset of a function of the application.

At time T3, the log player 230 may begin running the log from the simulation and sending log data to the debugger 220. For example, log data generated by a virtual platform, such as an autonomous driving simulator executing an autonomous driving application, may be run on the log player 230 and be sent to the debugger 220, from the log player 230, for use in debugging the source code of the application.

The debugger 220 may begin executing the application based on the received log data to debug the application. The debugger 220 passes any line breakpoints in the source code without suspending the execution, if the log player 230 has not indicated that a trigger condition has been satisfied.

At time T4, the log player 230 checks the log data for the trigger conditions (log breakpoints) that have been set at time T2 as the log is running. In some embodiments, the log player may begin checking for trigger conditions when the log player 230 begins running the log.

At time T5, the log player may determine that a trigger condition has been satisfied. For example, the log player may reach a point on a timeline that was set as a trigger condition. Based on the trigger condition being satisfied, the log player pauses running the log and notifies the debugger 220 that the trigger condition has been satisfied.

Upon (or based on) receiving the notification indicating that the trigger condition has been satisfied, the debugger 220 may begin checking for line breakpoints in the source code. As such, the debugger 220 may continue to execute the application until a line breakpoint in the source code is reached. When the breakpoint in the source code is reached, the debugger 220 pauses execution to allow a user to debug the application. Prior to receiving the notification indicating the trigger condition has been satisfied, the debugger 220 may not check for line breakpoints or may otherwise disregard the line breakpoints.

Figure 5:
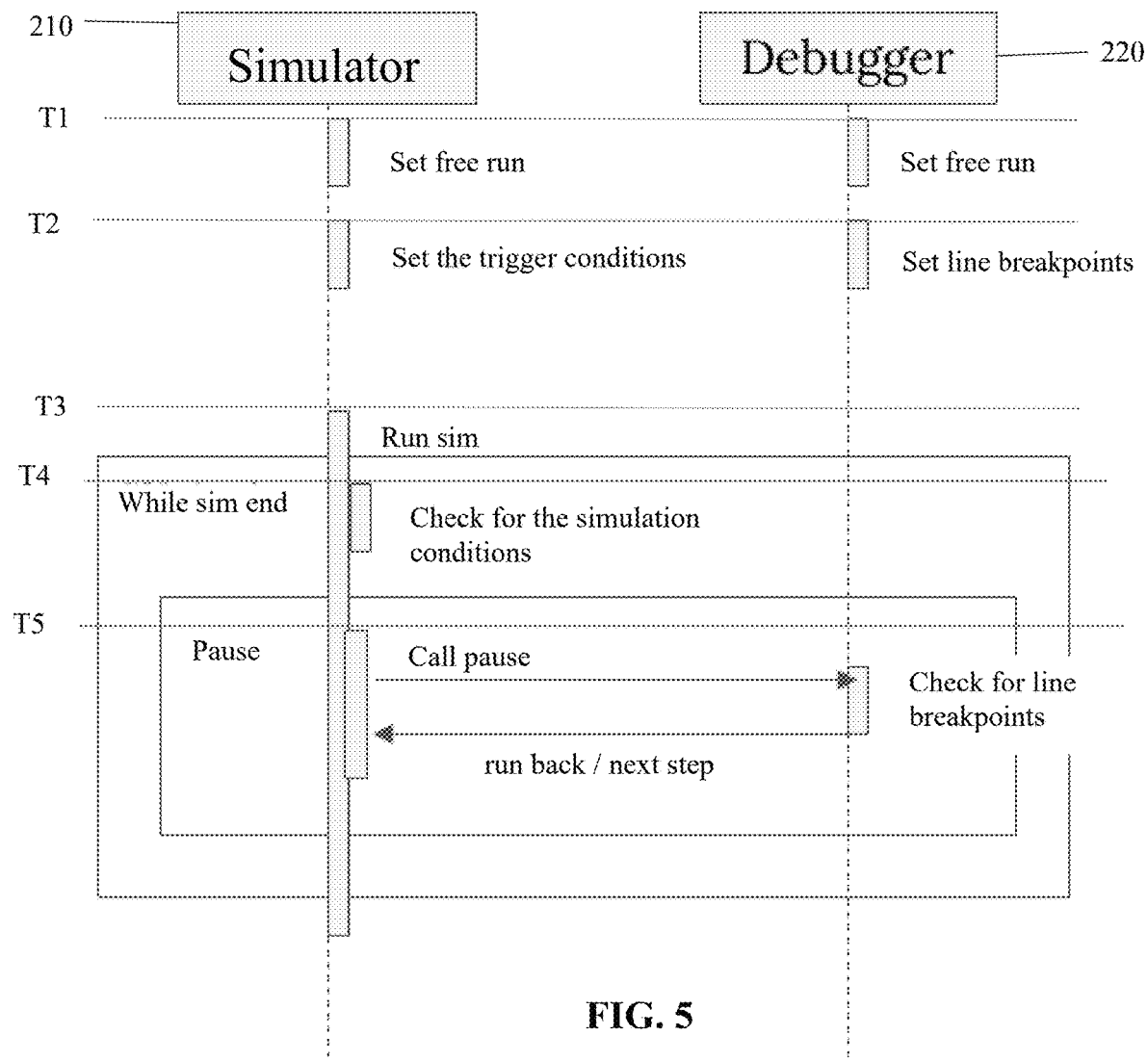
FIG. 5 is a diagram of an example process 500 for debugging an application according to another embodiment.

FIG. 5 is a diagram of an example process 500 for debugging an application according to another embodiment.

According to some embodiments, the application may be an autonomous driving application. In some implementations, one or more operations of FIG. 5 may be performed by the device 300. In some implementations, one or more operations of FIG. 5 may be performed by another device or a group of devices separate from or including the device 300.

As shown in FIG. 5, the process 500 may include a simulator 210 communicating with a debugger 220. According to an embodiment, the simulator 210 may be a virtual platform provided to simulate operation of an ego vehicle in a particular scenario while executing an autonomous driving application of the ego vehicle, and the debugger 220 may execute the application for debugging (e.g., in a debug mode).

Once the source code of the autonomous driving application is input into the simulator 210 and debugger 220, at time T1, both the simulator 210 and debugger 220 are set to free run.

At time T2 (or a different or prior time), one or more trigger conditions may be set in the simulator 210 as simulation conditions. For example, simulation conditions may be set as a time of collision between an ego vehicle and an object being less than a particular threshold, a failure of a particular model or object, a distance between an ego vehicle and objects or a lane line being less than a predetermined value, an ego vehicle speed being greater than a particular value, and/or an ego vehicle acceleration being greater than a particular value.

Also at time T2 (or a different time), one or more line breakpoints may be set in the source code being run by the debugger 220. The line breakpoints may be set at points in the code that may benefit from analysis. For example, a line breakpoints may be set at a point of the source code corresponding to the onset of a function of the application.

At time T3, the simulator 210 may begin running the simulation based on the application. For example, the simulator 210 may simulate operation of an ego vehicle based on an autonomous driving application.

At time T4, the simulator 210 may check for the trigger conditions (simulation conditions) that have been set at time T2 (or prior) as the simulation is running. In some embodiments, the simulator 210 may begin checking for the trigger conditions when the simulator 210 begins running.

At time T5, the simulator 210 may determine that a trigger condition has been satisfied. For example, the simulator 210 may determine that an ego vehicle speed is greater than a particular value. Based on the trigger condition being satisfied, the simulator 210 may pause the simulation and notify the debugger 220 that the trigger condition has been satisfied.

Upon (or based on) receiving the notification indicating the trigger condition has been satisfied, the debugger 220 may check for line breakpoints in the source code. As such, the debugger 220 may continue to execute the application until a line breakpoint in the source code is reached. When the breakpoint in the source code is reached, the debugger 220 may pause execution to allow a user to debug the application. Prior to receiving the notification indicating the trigger condition has been satisfied, the debugger 220 may not check for line breakpoints or may otherwise disregard the line breakpoints.

As described above, methods and systems according to embodiments provide a multi-trigger breakpoint for debugging target automotive applications in an electronic control unit (ECU) of an automobile. As a result of the multi-trigger breakpoint, a precise line of code can be set for debugging at a specific frame of simulation or log data, without repeatedly stopping execution at each frame. Precision and efficiency of debugging is therefore improved over related art debugging systems and methods.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for debugging an application for autonomous driving, the method comprising:
    setting, at a first timing, a line breakpoint in a line of source code of the application;
    setting a trigger condition relative to simulation data of a simulator executing the application, wherein the trigger condition is a simulation condition in the simulator, the setting the trigger condition comprises setting the trigger condition in the simulator, and the simulation condition comprises an ego vehicle acceleration being greater than a particular value;
    running the application by a debugger for debugging the application;
    based on the simulation condition being satisfied while executing the application by the simulator, pausing the simulator and sending a notification to the debugger that the ego vehicle acceleration is greater than the particular value;
    based on the debugger receiving the notification, beginning to check the line breakpoint; and
    pausing the running of the application by the debugger based on the line breakpoint being reached and the trigger condition being hit,
    wherein the debugger continues running the application even if the line breakpoint is reached before receiving the notification from the simulator,
    wherein the simulation data is log data generated by the simulator, and the trigger condition is a log breakpoint in a time line of the log data, the log breakpoint being set at the first timing,
    wherein the setting the trigger condition comprises setting the trigger condition via a log player for replaying the log data,
    wherein the debugger starts running in response to the debugger receiving the log data from the log player to debug the application,
    wherein the log player starts checking the log breakpoint after the debugger starts running, and
    wherein prior to receiving the notification, the debugger does not check for the line breakpoint and disregards the line breakpoint.

2. The method of claim 1, wherein the pausing the running of the application comprises:
    based on the log breakpoint being reached, pausing the replaying of the log data by the log player and sending another notification to the debugger; and
    based on the another notification being received by the debugger, pausing the running of the application by the debugger at the line breakpoint.

3. The method of claim 2, wherein in response to the another notification being received by the debugger, the debugger begins checking for the line breakpoint.

4. The method of claim 1 further comprising replaying of the log data by the log player, wherein the replaying of the log data by the log player comprises sending the log data to the debugger and checking the replayed log data for the log breakpoint.

5. The method of claim 1, wherein the log breakpoint is set at a timeline or a play bar of the log player.

6. The method of claim 1, wherein the pausing the running of the application comprises:
    based on the simulation condition being satisfied while executing the application by the simulator, pausing the simulator and sending another notification to the debugger; and
    based on the another notification and the line breakpoint being reached, pausing the running of the application by the debugger.

7. The method of claim 6, wherein:
    in response to the another notification being received by the debugger, the debugger begins checking for the line breakpoint.

8. The method of claim 1, wherein the executing the application by the simulator comprises checking for the simulation condition.

9. The method of claim 1, wherein the simulation condition comprises at least one of a failure of a particular model or object, a distance between the ego vehicle and objects or a lane line being less than a predetermined value, an ego vehicle speed being greater than a particular value.

10. A device for debugging an application for autonomous driving, the device comprising:
    a memory storing at least one instruction; and
    a processor configured to execute the at least one instruction to:
        set, at a first timing, a line breakpoint in a line of source code of the application;

set a trigger condition relative to simulation data of a simulator executing the application, wherein the trigger condition is a simulation condition in the simulator, the setting the trigger condition comprises setting the trigger condition in the simulator, and the simulation condition comprises an ego vehicle acceleration being greater than a particular value;

run the application by a debugger for debugging the application; based on the simulation condition being satisfied while executing the application by the simulator, pause the simulator and send a notification to the debugger that the ego vehicle acceleration is greater than the particular value;

based on the debugger receiving the notification, begin to check the line breakpoint; and pause the running of the application by the debugger based on the line breakpoint being reached and the trigger condition being hit, wherein the debugger continues running the application even if the line breakpoint is reached before receiving the notification from the simulator, wherein the simulation data is log data generated by the simulator, and the trigger condition is a log breakpoint in a time line of the log data, the log breakpoint being set at the first timing, wherein the processor is configured to execute the at least one instruction to set the trigger condition via a log player for replaying the log data, wherein the debugger starts running in response to the debugger receiving the log data from the log player to debug the application, wherein the log player starts checking the log breakpoint after the debugger starts running, and wherein prior to receiving the notification, the debugger does not check for the line breakpoint and disregards the line breakpoint.

11. The device of claim 10, wherein the processor is configured to execute the at least one instruction to:
based on the log breakpoint being reached, pause the replaying of the log data by the log player and send another notification to the debugger; and
based on the another notification being received by the debugger, pause the running of the application by the debugger at the line breakpoint.

12. The device of claim 11, wherein the processor is configured to execute the at least one instruction to, in response to the another notification being received by the debugger, control the debugger to begin checking for the line breakpoint.

13. The device of claim 10, wherein the processor is configured to execute the at least one instruction to replay the log data by the log player, send the log data from the log player to the debugger and check the replayed log data for the log breakpoint.

14. The device of claim 10, wherein the log breakpoint is set at a timeline or a play bar of the log player.

15. The device of claim 10, wherein the processor is configured to execute the at least one instruction to:
based on the simulation condition being satisfied while executing the application by the simulator, pause the simulator and send another notification to the debugger; and
based on the another notification and the line breakpoint being reached, pause the running of the application by the debugger.

16. A non-transitory computer-readable medium storing instructions that, when executed by one or more processors of a device, cause the one or more processors to:
set, at a first timing, a line breakpoint in a line of source code of an application;
set a trigger condition relative to simulation data of a simulator executing the application, wherein the trigger condition is a simulation condition in the simulator, the setting the trigger condition comprises setting the trigger condition in the simulator, and the simulation condition comprises an ego vehicle acceleration being greater than a particular value;
run the application by a debugger for debugging the application;
based on the simulation condition being satisfied while executing the application by the simulator, pause the simulator and send a notification to the debugger that the ego vehicle acceleration is greater than the particular value;
based on the debugger receiving the notification, begin to check the line breakpoint; and
pause the running of the application by the debugger based on the line breakpoint being reached and the trigger condition being hit,
wherein the debugger continues running the application even if the line breakpoint is reached before receiving the notification from the simulator,
wherein the simulation data is log data generated by the simulator, and the trigger condition is a log breakpoint in a time line of the log data, the log breakpoint being set at the first timing,
wherein the processor is configured to execute the at least one instruction to set the trigger condition via a log player for replaying the log data,
wherein the debugger starts running in response to the debugger receiving the log data from the log player to debug the application,
wherein the log player starts checking the log breakpoint after the debugger starts running, and
wherein prior to receiving the notification, the debugger does not check for the line breakpoint and disregards the line breakpoint.

* * * * *